Jan. 1, 1963 J. H. HOWARD 3,071,755
MAGNETIC CORES
Original Filed March 22, 1955
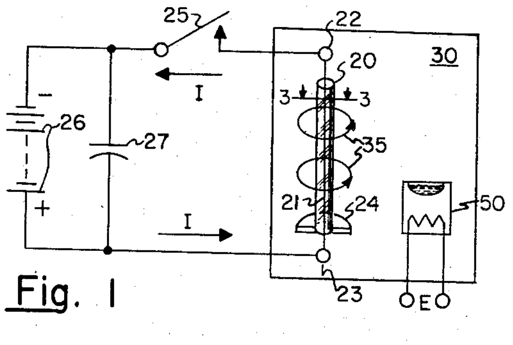
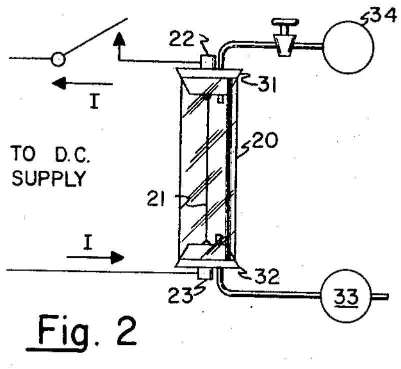
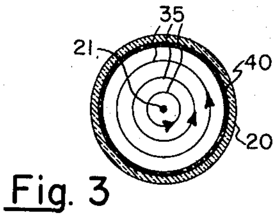
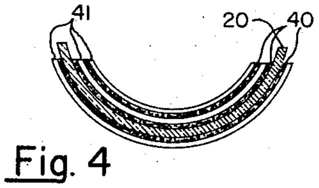
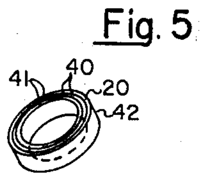
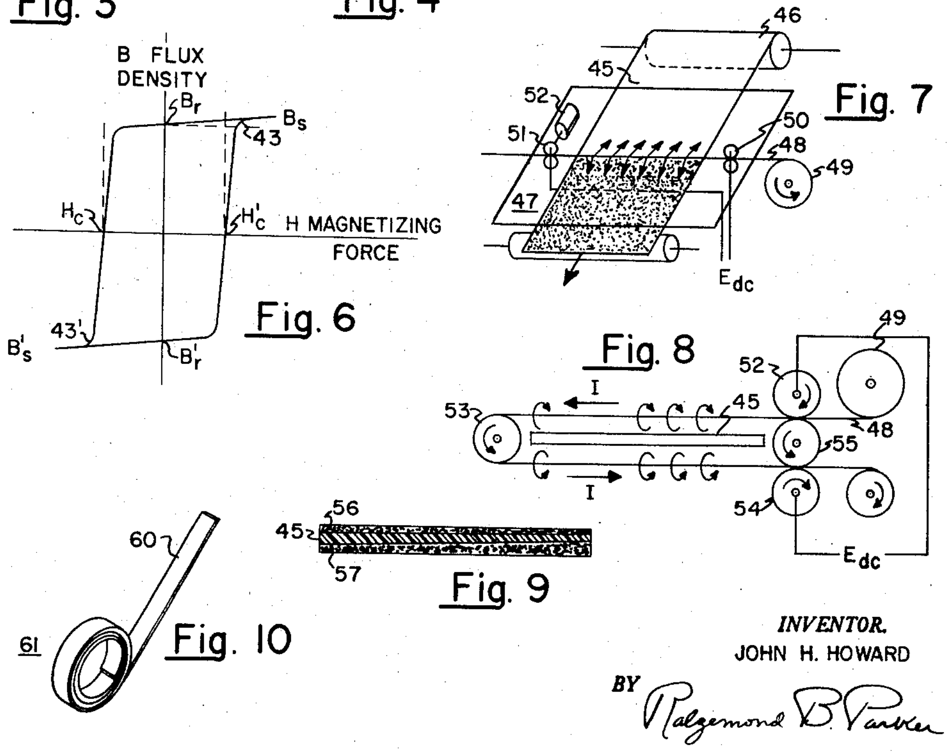
Fig. 1, Fig. 2, Fig. 3, Fig. 4, Fig. 5, Fig. 6, Fig. 7, Fig. 8, Fig. 9, Fig. 10
*INVENTOR.*
JOHN H. HOWARD
*BY* Raymond B. Parker
ATTORNEY

United States Patent Office 3,071,755
Patented Jan. 1, 1963

3,071,755
MAGNETIC CORES

John H. Howard, Wallingford, Pa., assignor to Burroughs Corporation, Detroit, Mich., a corporation of Michigan Original application Mar. 22, 1955, Ser. No. 495,943, now Patent No. 2,976,174, dated Mar. 21, 1961. Divided and this application June 5, 1958, Ser. No. 740,139
2 Claims. (Cl. 340—174)

This invention is concerned with improvements in magnetic cores and particularly with improvements in cores having square hysteresis loop characteristics, for use in magnetic switching or storage of binary-coded information.

This application is a division of my copending application for patent, Serial No. 495,943, filed March 22, 1955, now Patent No. 2,976,174, and assigned to the same assignee as the present application.

In the use of magnetic cores for switching or storage of information it is desirable to have high permeability material. It is also very important to provide a core wherein saturation of the flux density (B) occurs for a very small increment in the magnetizing force (H), i.e. the B-H curve should come as near as possible to a square shoulder at saturation. This saturation characteristic is enhanced when the magnetic domains of the core material are aligned in the direction in which magnetizing forces will be applied. When such alignment is achieved the material is said to be oriented.

Orientation can be explained by considering the magnetic core material to be composed of many magnetic domains, each of which is a family of magnetically associated atoms magnetized to saturation along the domain's axis. Each crystal of the core material has several such domains and six possible positions for alignment of the axis of its domains; two in opposite directions along each crystal axis. As each crystal is changed from unmagnetized to magnetically saturated condition, its magnetic domains respond in five recognizable phases:

I. Elastic displacement of the domain axes,
II. Strained displacement of the domains beyond their elastic limit in the crystal structure,
III. Reversible shift of domain axes, either 180° or to another crystal axis more nearly aligned with the applied magnetic force,
IV. Reversible rotation from a crystal axis to the axis of applied magnetic force, and
V. Irreversible rotation, wherein domains contribute their full magnetization.

When a material has been oriented during its production or processing, much of the above aligning has been done and this orientation is permanently retained by the finished magnetic structure. In this oriented condition, few domains are subject to rotation when a magnetizing force is applied and the elastic limit (phase I to phase II) is reached sooner. As the magnetizing force or field strength H, is increased, the flux density, B, increases extremely rapidly until saturation level is reached and then has very little increase for greater values of H. When plotted as a B-H hysteresis curve, this change at saturation is nearly a right-angle discontinuity in the curve. This hysteresis curve will be described later in detail.

A general object of this invention is to provide an improved magnetic core having substantially square-shaped hysteresis loop characteristics.

Another object of this invention is to provide an improved core of strongly oriented magnetic material and having substantially square-shaped hysteresis loop characteristics.

A further object of this invention is to provide an improved magnetic core in the form of a thin layer of coating and having bistable characteristics for the storage of information.

An additional object of this invention is to provide an improved product resulting from the production of ring-shaped cores through condensation of vaporized magnetic material upon a suitable form while orienting magnetically the vapor particles as they condense upon the form.

In accordance with one embodiment of this invention, a sleeve or cylinder of insulating material is fitted over a wire of the magnetic material to be used in making the cores and the wire is connected to a source of direct current of enough power capacity to vaporize the wire. The current which disintegrates the wire also builds up a magnetic field within the insulating cylinder, and the magnetic material particles are oriented by this field while depositing on the cylinder.

By providing for alternate depositions of magnetic and insulative material, a laminated structure can be realized embodying a modified feature of the invention.

In accordance with another embodiment of this invention a continuous wire of magnetic material is passed over the surface of a continuously moving strip of insulating material while a current large enough to cause evaporation is passed through that section of the wire. The current also provides the orienting magnetic field for the magnetic material as it deposits on the passing insulating material.

The strip or sheet of insulating material is thus provided with thin layers of magnetic material having oriented magnetic domains on opposite surface portions of the sheet. By spirally winding the sheet, thus provided, a new bistable magnetic element is realized having contiguous layers of magnetic material, the magnetic domains of each layer being oriented in a given direction.

These and other features are possible through use of the methods, structures, and apparatus disclosed herein and forming part of the present invention and that described and claimed in my aforesaid application for patent.

Reference is made to the accompanying drawings, wherein:

FIG. 1 is a diagrammatic view of an embodiment of a circuit and apparatus constructed in accordance with the teachings of this invention;

FIG. 2 is a partial diagram of another apparatus in accordance with this invention;

FIG. 3 is a cross-section along line 3—3 of FIG. 1 illustrating in sectional view a magnetic structure in accordance with a feature of the invention;

FIG. 4 is a fragmentary cross-section of a modified structure in the form of a cylinder with deposited materials thereon;

FIG. 5 is a perspective view of a completed core of the type having the sectional structure depicted in FIG. 4;

FIG. 6 is a nearly ideal B-H curve;

FIG. 7 is a perspective view of another apparatus embodying this invention;

FIG. 8 is an end view of a variation on the apparatus shown in FIG. 7;

FIG. 9 is a sectional view of a strip of magnetized core laminate produced in FIG. 8;

FIG. 10 is a perspective view of a core embodying a feature of the invention and made from the strip shown being produced in FIG. 7 or from the modifying strip of FIG. 9.

In FIG. 1, a cylinder 20 of insulating material, suitable for supporting a magnetic core, is placed over a wire 21 of suitable magnetic material such as 80% nickel/20% iron alloys. Wire 21 is then mounted between terminals 22 and 23, and cylinder 20 rests on support 24. Terminals 22 and 23 connect in turn to switch 25 and a source of direct current. This source of direct current can be battery 26. Capacitor 27 can be included to provide a high surge of current when switch 25 is closed. Other D.C. sources are equally useful, such as a generator or a rectifier, to convert A.C. to D.C.

The assembly of cylinder 20 and wire 21 is shown in a chamber 30 which can be evacuated or filled with a suitable inert gas to facilitate deposition of pure, unoxidized material from wire 21 upon the inner surface of cylinder 20. As shown in FIG. 2, this vacuum or inert atmosphere can be provided by stoppers 31 and 32 on which wire 21 and cylinder 20 are mounted. The resulting chamber can be evacuated through pump 33 or filled with inert gas from gas cylinder 34. When magnetic materials which do not oxidize or otherwise react chemically with air are used in wire 21, then the special atmosphere or vacuum becomes unnecessary.

When the wire 21 and cylinder 20 have been assembled as shown in FIGS. 1 and 2, switch 25 is closed and current I flows. The energy dissipated in wire 21 is equal to current I, squared, times resistance R of the wire, or $I^2R$, in watts. With a large current surge this energy heats wire 21 until it vaporizes. As the vaporization proceeds the particles of magnetic material vapor move in the magnetic field 35 generated by current I through wire 21.

This magnetic material deposits on the inner walls of cylinder 20. The deposit or layer 40 is oriented for application of magnetic flux 35 in the direction shown in FIGS. 1 and 3.

The amount of magnetic material which can be economically vaporized in this manner is limited by energy requirements and heat dissipation of the apparatus. Accordingly, layer 40 shown in FIG. 3 is quite thin. To provide a lower reluctance magnetic path, several layers 40 can be applied, alternating them with thin layers of insulation 41 as shown in FIG. 4. Insulating layers 41 can be deposited from a vapor phase or left as an adhering film in a painting or dipping operation between coating operations for magnetic material. Alternatively, a carrier wire with alternate magnetic and coating surfaces may be moved through the cylinder 20 for electrical heating for deposit in the layers 40 and 41.

When the desired coatings have been placed on cylinder 20, the cylinder can be cut into rings 42, as shown in FIG. 5. These rings 42 are oriented magnetic cores upon which windings are placed or through which current conductors are threaded.

As magnetizing force H is applied to core 42, the flux density rises very rapidly, as shown in FIG. 6, until point 43 is reached. Here, an increment in H causes little increase in flux density and core 42 is saturated. If magnetizing force H is reduced to zero, the core remains magnetized at $B_r$ or at residual flux density. Application of opposing magnetizing force reduces core flux density to zero at $H_c$, the coercive force level. A very small increment beyond $H_c$ takes the flux density B to saturation in the opposite direction. It will be noted that the transition from non-saturated to saturated flux density occurs at 43 and 43′ for a very small change in magnetizing force H. The curve approaches a square corner discontinuity at points 43 and 43′. Also the difference in flux density between residual $B_r$ and saturated $B_s$ flux densities is very small.

It is within the scope of this invention to utilize current conductors through a hollow sleeve 20 primarily to generate the magnetic force and flux 35 and to vaporize magnetic material from other sources either outside of the cylinder 20 for depositing on its outer wall or by judicious location of the heat source in the chamber to deposit on both the inner and outer walls of the cylinder. It is equally within the scope of this invention to utilize platinum or other wire of high melting point to vaporize magnetic material coated thereon as the current through it generates the required magnetic field. Oven 50 is provided within chamber 30 to vaporize magnetic material when a source outside cylinder 20 is required.

As in many other industrial processes, greater efficiency is achieved when production can be put on a continuous basis. This invention can be utilized to coat a continuously moving film of insulating material, as shown in FIG. 7. A strip 45 of insulating material is fed from roll 46 through vacuum chamber 47. Wire 48 of magnetic material is fed from supply roll 49, into chamber 47, through rollers 50, across the surface of film 45 with only a small spacing therefrom, and through rollers 51 and out of chamber 47. Current is derived from voltage source $E_{dc}$ and is fed to the section of wire 48 over film 45, through rollers 50 and 51. Motor 52 draws the wire across at a rate which leaves some cross section of wire after the evaporation over film 45. The arrows depict flow of particles from wire to film.

A more effective apparatus is shown in FIG. 8. It will be found that heating, and hence the evaporation rate, varies along the wire as its substance is lost to evaporation and its cross section is reduced. This is due to a smaller cross-sectional area and hence higher resistance section of wire having to carry the same current as larger cross sections. By returning the wire on the other side of film 45, a greater magnetic field is developed around the film, and a thin deposit on one side is compensated for by a thicker deposit at that point on the other side of the film. Rollers 52, 53 and 54 are metallic, and roller 55 is of ceramic or other suitable insulating material. The voltage $E_{dc}$ is applied to wire 48 through rollers 52 and 54. The apparatus of FIG. 8 also requires an evacuated enclosure.

FIG. 9 shows a cross section of the resulting strip of oriented magnetic core laminate. The rate of evaporation increased in one direction for coating 56 and in the opposite direction for coating 57, resulting in a substantially even total coating. The finished strip can be wrapped around to form a coiled core structure, either before or after it is cut into sections suitable for core widths. If the finished strip is cut into lengthwise strips 60, as shown in FIG. 10, it is feasible to coil such narrower strips around or through prefabricated coils. In applications where only a few turns of conductor or single conductors through the core, it is more practical to coil the strip into a finished core 61 and then mount the windings on the core.

What is claimed is:

1. A bistable magnetic element comprising a film-like sheet of non-magnetic electrically insulating material spirally wound with the layers contiguous to one another, a magnetic material having substantially square shaped hysteresis loop characteristics deposited as thin layers on opposite surface portions of the sheet, the magnetic domains of each layer being oriented in a given direction.

2. A bistable magnetic element comprising a film-like sheet of non-magnetic electrically insulating material spirally wound with the layers contiguous to one another, a magnetic material having substantially square shaped hysteresis loop characteristics deposited as thin layers on opposite surface portions of the sheet, the layers of magnetic material having the magnetic domains thereof oriented circumferentially on the spiral winding.

References Cited in the file of this patent

UNITED STATES PATENTS

| | | |
|---|---|---|
| 743,444 | Burgess | Nov. 10, 1903 |
| 2,284,406 | D'Entremont | May 26, 1942 |
| 2,792,563 | Rajchman | May 14, 1957 |

OTHER REFERENCES

"Nondestructive Sensing of Magnetic Cores," by Buck and Frank, published January 1954, "Communications and Electronics," pp. 822–830.

"Magnetic Materials for Digital-Computer Components," by Menyuk and Goodenough, published January 1955, "Journal of Applied Physics," vol. 26, No. 1, pages 8–18.

"Preparation of Thin Magnetic Films and Their Properties," by Blois, published August 1955, "Journal of Applied Physics," vol. 26, No. 8, pages 975–980.